(12) United States Patent
Kitamura et al.

(10) Patent No.: US 7,458,728 B2
(45) Date of Patent: Dec. 2, 2008

(54) ROTARY APPARATUS

(75) Inventors: Akihiro Kitamura, Takaoka (JP); Kosaku Kitamura, Takaoka (JP)

(73) Assignee: Kitamura Machinery Co., Ltd. (JP)

( * ) Notice: Subject to any disclaimer, the term of this patent is extended or adjusted under 35 U.S.C. 154(b) by 197 days.

(21) Appl. No.: 11/330,133

(22) Filed: Jan. 12, 2006

(65) Prior Publication Data

US 2006/0177168 A1    Aug. 10, 2006

(30) Foreign Application Priority Data

| Feb. 8, 2005 | (JP) | ............................. 2005-031758 |
| Oct. 21, 2005 | (JP) | ............................. 2005-307028 |
| Nov. 30, 2005 | (JP) | ............................. 2005-345019 |

(51) Int. Cl.
*F16C 19/00* (2006.01)
*F01M 11/08* (2006.01)

(52) U.S. Cl. ...................... 384/462; 384/461; 384/468; 184/6.23

(58) Field of Classification Search ................. 384/415, 384/461, 456, 462, 464–468, 472, 517, 474, 384/471; 409/231, 233, 590; 184/5.1, 6.18, 184/6.23, 6.6, 7.4
See application file for complete search history.

(56) References Cited

U.S. PATENT DOCUMENTS

| 2,826,103 | A | * | 3/1958 | Foster | ......................... 384/590 |
| 3,298,760 | A | * | 1/1967 | Linner et al. | ................. 384/464 |
| 3,624,435 | A | * | 11/1971 | Bunner | ......................... 310/93 |
| 4,082,381 | A | * | 4/1978 | Simmons et al. | ............. 384/472 |
| 4,192,472 | A | * | 3/1980 | Johnson | ....................... 241/215 |
| 4,265,334 | A | * | 5/1981 | Benhase, Jr. | ................ 184/6.11 |
| 4,320,633 | A | * | 3/1982 | Humphrey | .................... 192/32 |
| 4,759,427 | A | * | 7/1988 | Onose et al. | ................ 184/6.26 |
| 4,932,500 | A | * | 6/1990 | Smith et al. | ................... 184/5.1 |
| 4,993,979 | A | * | 2/1991 | Bland et al. | .................... 440/75 |
| 5,272,868 | A | * | 12/1993 | Ciokajlo et al. | ............. 60/39.08 |
| 5,927,863 | A | * | 7/1999 | De Bock | ...................... 384/468 |
| 5,971,306 | A | * | 10/1999 | Ganser et al. | ................ 241/207 |
| 6,007,441 | A | * | 12/1999 | Tysver | .......................... 474/70 |
| RE36,796 | E | * | 8/2000 | Sato et al. | ...................... 34/412 |
| 6,328,478 | B1 | * | 12/2001 | Fukuda et al. | .............. 384/475 |

(Continued)

FOREIGN PATENT DOCUMENTS

JP         58024700 A    *   2/1983

(Continued)

*Primary Examiner*—Marcus Charles
(74) *Attorney, Agent, or Firm*—Bacon & Thomas, PLLC (57) ABSTRACT

A rotary apparatus comprises a non-rotary part, a rotary shaft, a rotary member between the rotary shaft and the non-rotary part, an inside bearing between the rotary shaft and the rotary member, and an outside bearing between the rotary member and the non-rotary part. The inside bearing comprises first and second inside bearings spaced along a direction of a central axis of the rotary shaft. The outside bearing comprises first and second outside bearings spaced along the rotary shaft. An outer ring of the first inside bearing and an inner ring of the first outside bearing, and an outer ring of the second inside bearing and an inner ring of the second outside bearing, are fixed on the rotary member. By interlocking of the bearings, the rotary member slightly moves along the central axis, and at least two of the bearings receive respective preloads with a linkage relationship.

7 Claims, 3 Drawing Sheets

U.S. PATENT DOCUMENTS

| | | | |
|---|---|---|---|
| 6,357,922 B1 * | 3/2002 | Harbottle et al. | 384/466 |
| 6,431,760 B1 * | 8/2002 | Nawamoto et al. | 384/513 |
| 6,551,055 B2 * | 4/2003 | Rockwood | 415/111 |
| 6,640,933 B2 * | 11/2003 | Henry et al. | 184/5.1 |
| 6,651,633 B1 * | 11/2003 | Jones | 123/559.1 |
| 6,793,052 B2 * | 9/2004 | Imasaka et al. | 192/3.23 |
| 6,793,395 B1 * | 9/2004 | Studemann et al. | 384/101 |
| 7,000,734 B2 * | 2/2006 | Nawamoto et al. | 184/6.26 |

FOREIGN PATENT DOCUMENTS

| | | | |
|---|---|---|---|
| JP | 58174636 A | * | 10/1983 |
| JP | 2001165390 A | * | 6/2001 |

\* cited by examiner

ROTARY APPARATUS

FIELD OF THE INVENTION

The present invention relates to a rotary apparatus which comprises a non-rotary part and a rotary shaft rotatable relative to the non-rotary part. In particular, the rotary apparatus includes a rotary member between the rotary shaft and the non-rotary part. An inside bearing is provided between the rotary shaft and the rotary member. An outside bearing is provided between the rotary member and the non-rotary part.

BACKGROUND OF THE INVENTION

In a conventional rotary apparatus, if a rotary shaft rotates at a high speed, it is necessary to use a special bearing which is appropriate for high-speed rotation. When the rotary shaft rotates at a high speed, the bearing receives a large load. Therefore, it is expected to improve stability and lifetime of the bearing.

In Japanese Patent Unexamined Publication No. 2000-271804, the present applicant proposed a rotary apparatus allowing high-speed rotation of a rotary shaft without much loading against a bearing, even if the bearing has a low peripheral speed condition.

If the load applied on the bearing is imbalanced, however, backlash of the gear or increment of friction sometimes causes a trouble on rotation.

On the other hand, lubricant for the bearing should be appropriately used in view with a configuration of a rotary shaft, a rotary member, and/or a non-rotary part.

SUMMARY OF THE INVENTION

An object of the present invention is to provide a rotary apparatus in which a rotary shaft can rotate at a high speed while a bearing is stabilized.

The wordings of all the claims are included in the description by reference.

According to the present invention, it is possible to balance a preload applied on an outside bearing and an inside bearing. It is possible to rotate the rotary shaft stably at high speed.

In a mode of the present invention, the first rotary member is divided into a first rotary member and a second rotary member. The outer ring of the first inside bearing, the first rotary member, and the inner ring of the first outside bearing are integrally fixed with each other. The outer ring of the second inside bearing, the second rotary member, and the inner ring of the second outside bearing are integrally fixed with each other. Further in a condition in which the inner ring of the first inside bearing and the inner ring of the second inside bearing are fixed on the rotary shaft, when the outer ring of the first outside bearing and the outer ring of the second outside bearing are being fixed on the non-rotary part, the outer ring of the first outside bearing and the outer ring of the second outside bearing slightly move in opposite directions along the direction of the central axis of the rotary shaft. Due to interlocking with them, the first rotary member and the second rotary member slightly move in opposite directions along the direction of the central axis of the rotary shaft. Thus, the first inside bearing and the first outside bearing receive a first preload and a second preload, respectively, under the linkage relationship along a first direction along the direction of the central axis of the rotary shaft, and then the second inside bearing and the second outside bearing receive a first preload and a second preload, respectively, under the linkage relationship along a second direction opposite to the first direction along the direction of the central axis of the rotary shaft. As a result, it is possible to balance the first preload applied on the first inside bearing and the second inside bearing, and it is also possible to balance the second preload applied on the first outside bearing and the second outside bearing.

In another mode of the present invention, the outer ring of the first inside bearing is fixed at a rear end of the first rotary member. The outer ring of the second inside bearing is fixed at a front end of the second rotary member. The inner ring of the first outside bearing is arranged in an intermediate area between the front end of the first rotary member and an installing position of the first inside bearing. The inner ring of the second outside bearing is arranged in an intermediate area between the rear end of the second rotary member and an installing position of the second inside bearing. As a result, it is possible to balance the preload applied on the first outside bearing and the second outside bearing and the preload applied on the first inside bearing and the second inside bearing.

In another mode of the present invention, the first rotary member comprises a first large diameter part and a first small diameter part. The outer ring of the first inside bearing is supported inside the first large diameter part. The inner ring of the first outside bearing is supported outside the first large diameter part. The second rotary member comprises a second large diameter part and a second small diameter part. The outer ring of the second inside bearing is supported inside the second large diameter part. The inner ring of the second outside bearing is supported outside the second small diameter part. As a result, it is possible to balance the preload in a simple configuration and efficiently.

In another mode of the present invention, the rotary member is configured as a single member. In a condition in which the inner ring of the first inside bearing and the inner ring of the second inside bearing are fixed on the rotary shaft, when the outer ring of the first outside bearing and/or the outer ring of the second outside bearing are/is being fixed on the non-rotary part, the outer ring of the first outside bearing and/or the outer ring of the second outside bearing slightly move/moves along the direction of the central axis of the rotary shaft. Due to interlocking with them, the rotary member slightly moves along the direction of the central axis. Thereby, all of the first inside bearing, the first outside bearing, the second inside bearing, the second outside bearing receive respective preloads under the linkage relationship. As a result, it is possible to more simplify the configuration of rotary member.

A rotary apparatus according to another mode of the present invention comprises a non-rotary part, a rotary shaft rotatable relative to the non-rotary part, a rotary member provided between the rotary shaft and the non-rotary part, an inside bearing provided between the rotary shaft and the rotary member, and an outside bearing provided between the rotary member and the non-rotary part. The inside bearing comprises a first inside bearing and a second inside bearing which are spaced to each other along a direction of a central axis of the rotary shaft. The outside bearing comprises a first outside bearing and a second outside bearing which are spaced each other along the direction of the central axis of the rotary shaft. An outer ring of the first inside bearing and an inner ring of the first outside bearing are fixed on the rotary member. An outer ring of the second inside bearing and an inner ring of the second outside bearing are fixed on the rotary member. Under a condition in which an inner ring of the first inside bearing and an inner ring of the second inside bearing are fixed on the rotary shaft, when an outer ring of the first outside bearing and/or an outer ring of the second outside bearing are/is being fixed on the non-rotary part, the outer ring of the first outside bearing and/or the outer ring of the second outside bearing move/moves along the direction of the central axis of the rotary shaft. Due to interlocking with them, the rotary member slightly moves along the direction of the central axis. Thus, at least two of the first inside bearing, the first outside bearing, the second inside bearing, and the second outside bearing receive respective preloads under a linkage relationship.

Preferably, the first outside bearing, the first outside bearing, the second inside bearing, and the second outside bearing have a good linkage relationship. Only the first inside bearing and the first outside bearing may have the linkage relationship. Only the first inside bearing, the first outside bearing, and the second inside bearing may have the linkage relationship.

Otherwise, a rotary apparatus according to the present invention comprises a non-rotary part, a rotary shaft rotatable relative to the non-rotary part, a rotary member provided between the rotary shaft and the non-rotary part, an inside bearing provided between the rotary shaft and the rotary member, and an outside bearing provided between the rotary member and the non-rotary part. The outside bearing is lubricated with an oil air or an oil mist, while the inside bearing is lubricated with a grease.

Preferably, a rotary apparatus according to the present invention is applied to a spindle head of a tool machine.

Preferably, the rotary member is configured as a coupling sleeve. A rotary apparatus according to the present invention includes a configuration of the rotary member rotatably driven together with or independently of the rotary shaft, although the rotary member is configured rotatably between the rotary shaft and the non-rotating part in the following embodiment.

In another mode of the present invention, the rotary member is divided into a first rotary member and a second rotary member. The outer ring of the first inside bearing, the first rotary member, and the inner ring of the first outside bearing are integrally fixed with each other. The outer ring of the second inside bearing, the second rotary member, and the inner ring of the second outside bearing are integrally fixed with each other. In a condition in which the inner ring of the first inside bearing and the inner ring of the second inside bearing are fixed on the rotary shaft, when the outer ring of the first outside bearing and the outer ring of the second outside bearing are being fixed on the non-rotary part, the outer ring of the first outside bearing and the outer ring of the second outside bearing slightly move in opposite directions along the direction of the central axis of the rotary shaft. Due to interlocking with them, the first rotary member and the second rotary member slightly move in opposite directions along the direction of the central axis of the rotary shaft, thereby the first inside bearing and the first outside bearing receive a first preload and a second preload, respectively, under the linkage relationship along a first direction along the direction of the central axis of the rotary shaft. Further the second inside bearing and the second outside bearing receive a first preload and a second preload, respectively, under the linkage relationship along a second direction opposite to the first direction along the direction of the central axis of the rotary shaft.

In another mode of the present invention, the outer ring of the first inside bearing is fixed at a rear end of the first rotary member. The outer ring of the second inside bearing is fixed at a front end of the second rotary member. The inner ring of the first outside bearing is arranged in an intermediate area between the front end of the first rotary member and an installing position of the first inside bearing. The inner ring of the second outside bearing is arranged in an intermediate area between the rear end of the second rotary member and an installing position of the second inside bearing.

In another mode of the present invention, the first rotary member comprises a first large diameter part and a first small diameter part. The outer ring of the first inside bearing is supported inside the first large diameter part. The inner ring of the first outside bearing is supported outside the first large diameter part. The second rotary member comprises a second large diameter part and a second small diameter part. The outer ring of the second inside bearing is supported inside the second large diameter part. The inner ring of the second outside bearing is supported outside the second small diameter part. The rotary member may be configured as a cylindrical member with a protuberance etc.

In another mode of the present invention, the rotary member is configured as a single member. In a condition in which the inner ring of the first inside bearing and the inner ring of the second inside bearing are fixed on the rotary shaft, when the outer ring of the first outside bearing and/or the outer ring of the second outside bearing are/is being fixed on the non-rotary part, the outer ring of the first outside bearing and/or the outer ring of the second outside bearing slightly move/moves along the direction of the central axis of the rotary shaft. Due to interlocking with them, the rotary member slightly moves along the direction of the central axis. As a result, all of the first inside bearing, the first outside bearing, the second inside bearing, the second outside bearing receive respective preloads under the linkage relationship.

It is preferable that, when the outer ring of the first outside bearing or the outer ring of the second outside bearing is being fixed on the non-rotary part, the outer ring of the first outside bearing or the outer ring of the second outside bearing slightly moves along the direction of the central axis of the rotary shaft. When the outer ring of the first outside bearing and the outer ring of the second outside bearing are being fixed on the non-rotary part, however, the outer ring of the first outside bearing and the outer ring of the second outside bearing may slightly move along the direction of the central axis of the rotary shaft.

In a conventional rotary apparatus, it has been believed that an outer ring of a bearing must be fixed. The present invention is based on a completely different concept from such a conventional rotary apparatus. According to the present invention, rotating an outer ring of a bearing allows ultra high-speed rotation. The present invention is an epoch-making one.

In a machine tool, since a rotary shaft has a main role for processing a metal material by means of a cutter etc, it is preferable to improve function or performance of the rotary shaft.

There is a limit to a peripheral speed (rotating speed× circumferential length of a bearing) of the bearing to be used in the rotary apparatus. A dN value (diameter of the bearing× rotating speed) represents such a limit as performance of the bearing. If one would like to perform high-speed rotation, there has been no choice but to reduce the diameter of the bearing to lower the peripheral speed of the rotary shaft.

If the diameter of the bearing is reduced, shaft rigidity and power transmission property lowers. An existing rotary shaft for high-speed rotation can only provide an extremely low torque for use in minute processing.

According to the present invention, it is possible to increase a limit rotating speed of the bearing drastically without reducing the diameter of the bearing. According to the present invention, in comparison with the conventional apparatus, a twice or larger torque of 11.7 Nm can be obtained, for example.

The outer ring of the bearing for supporting the rotary shaft is usually fixed on a bearing housing thereof.

In another mode of the present invention, a bearing is attached to a first shaft (rotary shaft), while an outer ring of the bearing is installed into a second shaft (coupling sleeve). The second shaft (coupling sleeve) is further supported as another bearing. Thus, it is possible to rotate the second shaft. In this case, a double bearing configuration is achieved. The first shaft (rotary shaft) can rotate at a relative speed of over the limit rotating speed without exceeding the actual limit rotating speed of the bearing.

For example, if the diameter of the inside bearing is 50 mm, if the limit rotating speed of the inside bearing is 25,000 rotations per minute, and if the limit rotating speed of the outside bearing is 15,000 rotations per minute, the shaft with the diameter of 50 mm rotates at a speed of no less than 40,000 rotations per minute. In such a case, it is possible to obtain 1.6 times of the rotating speed and achieve high-speed rotation and large torque in small power consumption of no more than 3.7 kW. If one attempts to obtain the same torque in the conventional apparatus, power consumption of no less than 30 KW (in the case of built-in motor) is necessary. Thus, according to the present invention, it is possible to achieve saving of power consumption of about one eighth, for example, and to contribute to environmental problems.

In recent years, it is possible to raise the rotating speed of the bearing, as the performance of the rotary apparatus is improving. If an apparatus according to the present invention is used, the high rotating speed of 50,000, 60,000, or 70,000 rotations per minute is possible.

DESCRIPTION OF THE PREFERRED EMBODIMENTS

Embodiment 1

A first embodiment according to the present invention will be described with reference to FIG. 1.

Figure 1:
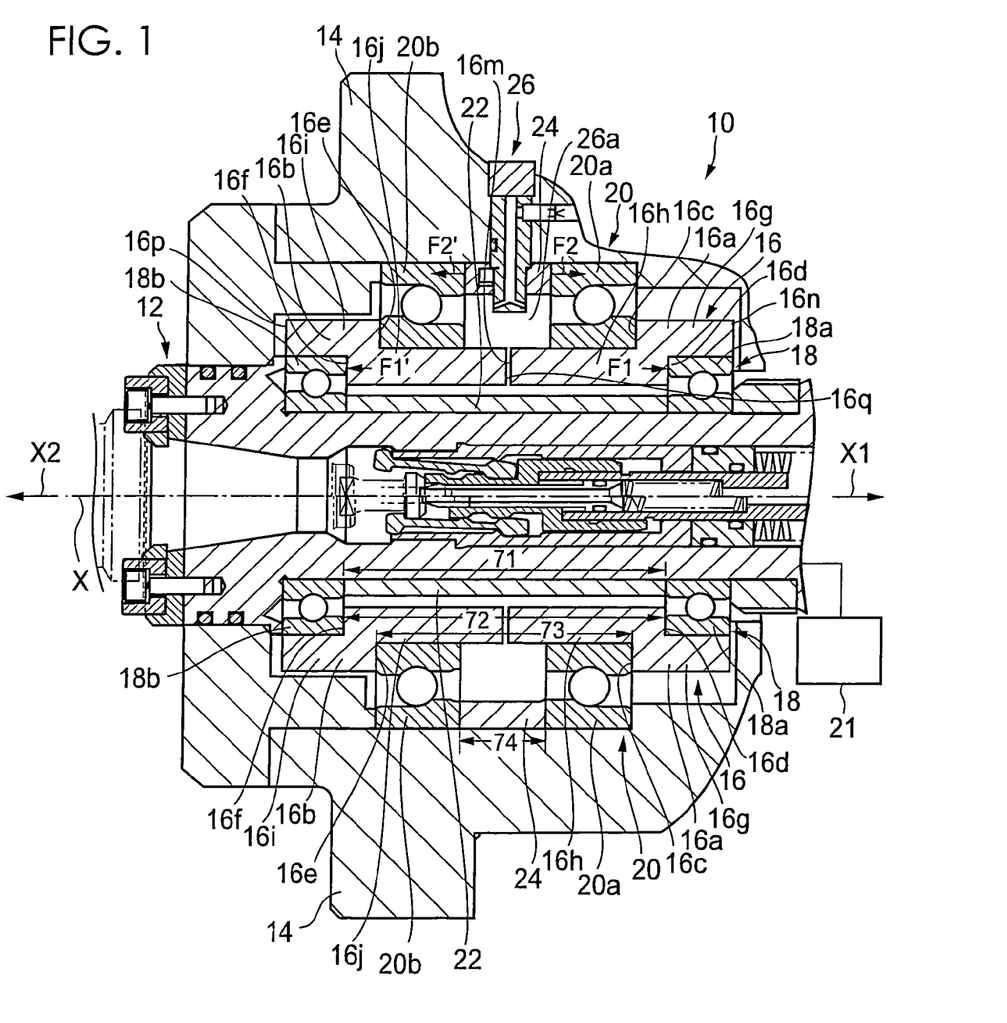
FIG. 1 is a partial sectional view illustrating a rotary apparatus according to one embodiment of the present invention.

FIG. 1 is a partial sectional view illustrating one example of a rotary apparatus according to the present invention.

A rotary apparatus 10 has a rotary shaft 12, a non-rotary part 14, a coupling sleeve 16, an inside bearing 18, an outside bearing 20, and a driving source 21. The coupling sleeve is configured as a rotary member of the present invention.

The rotary apparatus 10 is preferably used for a spindle head of a machine tool.

The rotary shaft 12 is supported rotatably relative to the non-rotary part 14. The coupling sleeve 16 is provided between the rotary shaft 12 and the non-rotary part 14. The inside bearing 18 is provided between the rotary shaft 12 and the coupling sleeve 16. The outside bearing 20 is provided between the coupling sleeve 16 and the non-rotary part 14. The rotary shaft 12 can be rotated by means of the driving source 21. The coupling sleeve 16 is freely rotatable between the rotary shaft 12 and the non-rotary part 14.

The inside bearing 18 comprises a first inside bearing 18a and a second inside bearing 18b spaced in a direction X of a central axis of the rotary shaft 12.

An inner ring collar 22 is provided between an inner ring of the first inside bearing 18a and an inner ring of the second inside bearing 18b. The inner ring collar 22 rotates together with the rotary shaft 12. A length of the inner ring collar 22 in the direction X of the central axis is indicated by reference numeral 71. The inside bearing 18 is lubricated with grease. This is because if an air nozzle were used for injecting oil, parts thereof would rotate.

The outside bearing 20 comprises a first outside bearing 20a and a second outside bearing 20b spaced in the direction X of the central axis of the rotary shaft 12.

An outer ring collar 24 is provided between an outer ring of the first outside bearing 20a and an outer ring of the second outside bearing 20b. The outer ring collar 24 is stationary together with the non-rotary part 14. A length of the outer ring collar 24 in the direction X of the central axis is indicated by reference numeral 74. A supply means 26 is provided on the outer ring collar 24 for supplying oil air or oil mist as lubricant with the outside bearing 20. This is because higher rotating speed is obtained with the oil air or oil mist.

In the embodiment shown in FIG. 1, the coupling sleeve 16 is divided into a first coupling sleeve 16a and a second coupling sleeve 16b.

An outer ring of the first inside bearing 18a and an inner ring of the first outside bearing 20a are fixed on the first coupling sleeve 16a.

An outer ring of the second inside bearing 18b and an inner ring of the second outside bearing 20b are fixed on the second coupling sleeve 16b.

The first coupling sleeve 16a comprises a first large diameter part 16g and a first small diameter part 16h. The outer ring of the first inside bearing 18a is supported inside the first large diameter part 16g. The inner ring of the first outside bearing 20a is supported outside the first small diameter part 16h.

Furthermore, the second coupling sleeve 16b comprises a second large diameter part 16i and a second small diameter part 16j. The outer ring of the second inside bearing 18b is supported inside the second large diameter part 16i. The inner ring of the second outside bearing 20b is supported outside the second small diameter part 16j.

The first coupling sleeve 16a has a first outside support surface 16c and a first inside support surface 16d. The first outside support surface 16c and the first inside support surface 16d are vertical with respect to the direction X of the central axis of the rotary shaft 12.

A pushing force applied on the outer ring of the first outside bearing 20a in the direction X of the central axis of the rotary shaft 12 is applied on the outer ring of the first inside bearing 18a via the first outside support surface 16c and the first inside support surface 16d of the first coupling sleeve 16a.

The second coupling sleeve 16b has a second outside support surface 16e and a second inside support surface 16f. The second outside support surface 16e and the second inside support surface 16f are vertical with respect to the direction X of the central axis of the rotary shaft 12.

A pushing force applied on the outer ring of the second outside bearing 20b in the direction X of the central axis of the rotary shaft 12 is applied on the outer ring of the second inside bearing 18b via the second outside support surface 16e and the second inside support surface 16f of the second coupling sleeve 16b.

The pushing force is applied on the inner ring of the first outside bearing 20*a* along the direction X of the central axis of the rotary shaft 12. The first coupling sleeve 16*a* transmits the pushing force to the outer ring of the first inside bearing 18*a*.

In addition, an opposite pushing force to the foregoing pushing force is applied on the inner ring of the second outside bearing 20*b* along the direction X of the central axis of the rotary shaft 12. The second coupling sleeve 16*b* transmits the opposite pushing force to the outer ring of second inside bearing 18*b*.

A size of the coupling sleeve 16 (distance between the first inside support surface 16*d* and the second inside support surface 16*f*) is indicated by a reference numeral 72. A first preload F1 applied on the first inside bearing 18*a* and a first preload F1' applied on the second inside bearing 18*b* depend on the size 71 of the inner ring collar 22 and the size 72 of the coupling sleeve 16.

A size of the inner ring width (distance between the first outside support surface 16*c* and the second outside support surface 16*e*) is indicated by reference numeral 73. A second preload F2 applied on the first outside bearing 20*a* and a second preload F2' applied on the second outside bearing 20*b* depend on the inner ring width 73 and the size 74 of the outer ring collar 24.

Since the coupling sleeve 16 is divided into the first coupling sleeve 16*a* and the second coupling sleeve 16*b*, the sizes 72 and 73 determine a balance between the first preloads F1, F1' and the second preloads F2, F2'.

Thus, it is possible to balance the preload F1 applied on the first inside bearing 18*a* and the preload F2 applied on the first outside bearing 20*a*. In addition, it is possible to balance the preload F1' applied on the second inside bearing 18*b* and the preload F2' applied on the second outside bearing 20*b*.

In the following, configuration around the coupling sleeve 16, the inside bearing 18, and the outside bearing 20 will be described in more detail. In the following, a rear end is at a side of the driving source 21, while a front end is at a side of a work piece not shown in the figure.

A front end of the outer ring of the first inside bearing 18*a* is fixed on a rear end 16*n* of the first coupling sleeve 16*a*. A rear end of the outer ring of the first inside bearing 18*a* is released. The inner ring of the first inside bearing 18*a* is fixed relative to the rotary shaft 12 and the inner ring collar 22.

A rear end of the outer ring of the second inside bearing 18*b* is fixed on a front end 16*p* of the second coupling sleeve 16*b*. Between a front end of the outer ring of the second inside bearing 18*b* and the non-rotary part 14, a small space is provided. The inner ring of the second inside bearing 18*b* is fixed relative to the rotary shaft 12 and the inner ring collar 22.

The first outside bearing 20*a* is arranged in an intermediate area between a front end 16*m* of the first coupling sleeve 16*a* and an installing position of the first inside bearing 18*a*. A rear end of the inner ring of the first outside bearing 20*a* is fixed on the first outside support surface 16*c* of the first coupling sleeve 16*a*. The front end of the inner ring of the first outside bearing 20*a* is released. Between a rear end of the outer ring of the first outside bearing 20*a* and the non-rotary part 14, a small space is provided. A front end of the outer ring of the first outside bearing 20*a* is fixed on the outer ring collar 24.

The second outside bearing 20*b* is arranged in an intermediate area between a rear end 16*q* of the second coupling sleeve 16*b* and an installing position of the second inside bearing 18*b*. A rear end of the inner ring of the second outside bearing 20*b* is released. A front end of the inner ring of the second outside bearing 20*b* is fixed on the second outside surface 16*e* of the second coupling sleeve 16*b*. A rear end of the outer ring of the second outside bearing 20*b* is fixed on the outer ring collar 24. Between a front end of the outer ring of the second outside bearing 20*b* and the non-rotary part 14, a small space is provided.

The outer ring of the first inside bearing 18*a*, the first coupling sleeve 16*a*, and the inner ring of the first outside bearing 20*a* are integrally fixed with one another. The first inside bearing 18*a* and the first outside bearing 20*a* receive the first preload F1 and the second preload F2, respectively, under the linkage relationship in a first direction X1 along the direction X of the central axis of the rotary shaft 12. In this case, the pushing force is applied on the front end of the outer ring of the first inside bearing 20*a*. The pushing force is transmitted to the inner ring of the first inside bearing 18*a* via balls of the first outside bearing 20*a*, the rear end of the inner ring of the first outside bearing 20*a*, the first coupling sleeve 16*a*, the front end of the outer ring of the first inside bearing 18*a*, and balls of the first inside bearing 18*a*.

The outer ring of the second inside bearing 18*b*, the second coupling sleeve 16*b*, and the inner ring of the second outside bearing 20*b* are integrally fixed with one another. The second inside bearing 18*b* and the second outside bearing 20*b* receive the first preload F1' and the second preload F2', respectively, in a second direction X2 opposite to the first direction X1 along the direction X of the central axis of the rotary shaft 12. In this case, the pushing force is applied on the rear end of the outer ring of the second outside bearing 20*b*. The pushing force is transmitted to the inner ring of the second inside bearing 18*b* via balls of the second outside bearing 20*b*, the front end of the inner ring of the second outside bearing 20*b*, the second coupling sleeve 16*b*, the rear end of the outer ring of the second inside bearing 18*b*, and balls of the second inside bearing 18*b*.

In the embodiment shown in FIG. 1, under a condition in which the inner ring of the first inside bearing 18*a* and the inner ring of the second inside bearing 18*b* are fixed on the rotary shaft 12, when the outer ring of the first outside bearing 20*a* and the outer ring of the second outside bearing 20*b* are being fixed on the non-rotary part 14, the outer ring of the first outside bearing 20*a* and the outer ring of the second outside bearing 20*b* slightly move in opposite directions along the direction X of the central axis of the rotary shaft 12. Interlocking with such, the first coupling sleeve 16*a* and the second coupling sleeve 16*b* slightly move in opposite directions along the direction X of the central axis of the rotary shaft. The first inside bearing 18*a* and the first outside bearing 20*a* receive the first preload F1 and the second preload F2, respectively, under the linkage relationship along the first direction X1 along the direction X of the central axis of the rotary shaft. Further, the second inside bearing 18*b* and the second outside bearing 20*b* receive the first preload F1' and the second preload F2', respectively, under the linkage relationship along the second direction opposite to the first direction X1 along the direction X of the central axis of the rotary shaft 12.

Thus, it is possible to balance the first preload and the second preload applied on the inside bearing 18 and the outside bearing 20, respectively, and obtain stable rotation.

The supply means 26 will be explained in more detail.

The supply means 26 is provided on the non-rotary part 14. A tip of the supply means 26 is located in a space 26*a* between the first outside bearing 20*a* and the second outside bearing 20*b*. The oil air or the oil mist is supplied from the supply means 26. The oil air or the oil mist is supplied into the first outside bearing 20*a* and the second outside bearing 20*b*.

Embodiment 2

Figure 2:
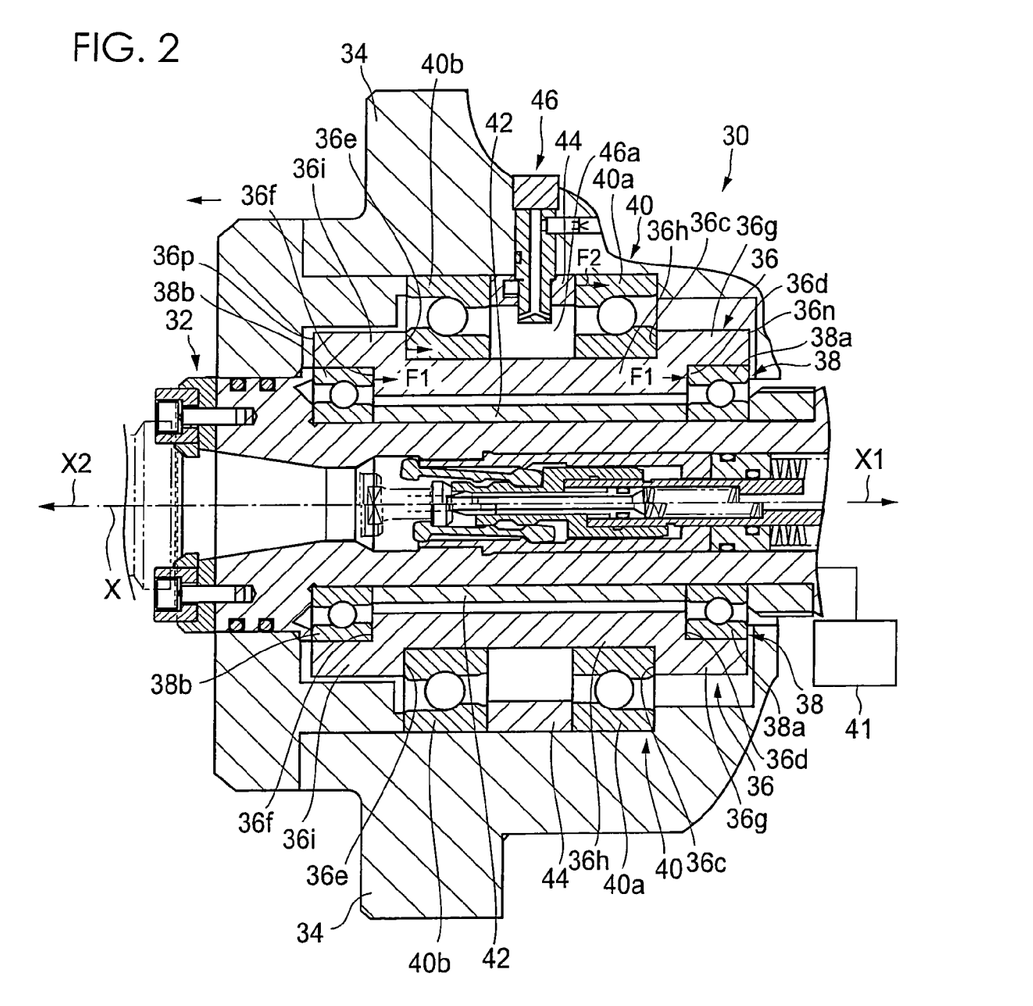
FIG. 2 is a partial sectional view illustrating a rotary apparatus according to another embodiment of the present invention.

A second embodiment according to the present invention will be described with reference to the drawings.

FIG. 2 is a partial sectional view illustrating one example of a rotary apparatus according to the present invention.

A rotary apparatus 30 has a rotary shaft 32, a non-rotary part 34, a coupling sleeve 36, an inside bearing 38, an outside bearing 40, and a driving source 41. The coupling sleeve is configured as a rotary member of the present invention. Since a supply means 46 has the same configuration as the supply means 26 of FIG. 1, explanation thereof will be omitted.

The rotary apparatus 30 is preferably used for a spindle head of a machine tool.

The rotary shaft 32 is supported rotatably relative to the non-rotary part 34. The coupling sleeve 36 is provided between the rotary shaft 32 and the non-rotary part 34. The inside bearing 38 is provided between the rotary shaft 32 and the coupling sleeve 36. The outside bearing 40 is provided between the coupling sleeve 36 and the non-rotary part 34. The rotary shaft 32 can be rotated by means of the driving source 41. The coupling sleeve 36 is freely rotatable between the rotary shaft 32 and the non-rotary part 34.

The inside bearing 38 comprises a first inside bearing 38a and a second inside bearing 38b spaced in a direction X of a central axis of the rotary shaft 32. The first inside bearing 38a and the second inside bearing 38b can be faced in the same direction.

An inner ring collar 42 is provided between an inner ring of the first inside bearing 38a and an inner ring of the second inside bearing 38b. The inner ring collar 42 rotates together with the rotary shaft 32.

The outside bearing 40 comprises a first outside bearing 40a and a second outside bearing 40b spaced in the direction X of the central axis of the rotary shaft 32.

An outer ring collar 44 is provided between an outer ring of the first outside bearing 40a and an outer ring of the second outside bearing 40b. The outer ring collar 44 is stationary together with the non-rotary part 34.

In the embodiment shown in FIG. 2, the coupling sleeve 36 comprises a single member.

An outer ring of the first inside bearing 38a and an inner ring of the first outside bearing 40a are fixed on the coupling sleeve 36.

An outer ring of the second inside bearing 38b and an inner ring of the second outside bearing 40b are fixed on the coupling sleeve 36.

The coupling sleeve 36 comprises a first large diameter part 36g, a small diameter part 36h, and a second large diameter part 36i. The outer ring of the first inside bearing 38a is supported inside the first large diameter part 36g. The inner ring of the first outside bearing 40a and the inner ring of the second outside bearing 40b are supported outside the small diameter part 36h.

The outer ring of the second inside bearing 38b is fixed on the coupling sleeve 36 by means of a stopper not shown in the figure. The outer ring of the second outside bearing 40b is stationary.

The coupling sleeve 36 has a first outside support surface 36c, a first inside support surface 36d, a second outside support surface 36e, and a second inside support surface 36f. The first outside support surface 36c, the first inside support surface 36d, the second outside support surface 36e, and the second inside support surface 36f are vertical with respect to the direction X of the central axis of the rotary shaft 32.

A pushing force is applied on the outer ring of the first outside bearing 40a in the direction X of the central axis of the rotary shaft 32. The pushing force is applied on the outer ring of the first inside bearing 38a via the first outside support surface 36c and the first inside support surface 36d. Further, a pushing force applied on the coupling sleeve 36 is applied on the inner ring of the second outside bearing 40b via the second outside support surface 36e.

The pushing force is applied on the inner ring of the first outside bearing 40a along the direction X of the central axis of the rotary shaft 32. The coupling sleeve 36 transmits the pushing force to the outer ring of the first inside bearing 38a. Furthermore, the pushing force is applied on the inner ring of the second outside bearing 40b along the direction X of the central axis of the rotary shaft 32. The coupling sleeve 36 transmits the pushing force to the outer ring of the second outside bearing 40b.

Thus, it is possible to balance at least a first preload F1 applied on the first inside bearing 38a and a second preload F2 applied on the first outside bearing 40a.

In the following, configuration around the coupling sleeve 36, the inside bearing 38, and the outside bearing 40 will be described in more detail. In the following, a rear end is at a side of the driving source 41, while a front end is at a side of a work piece not shown in the figure.

A front end of the outer ring of the first inside bearing 38a is fixed on a rear end 36n of the coupling sleeve 36. A rear end of the outer ring of the first inside bearing 38a is released. The inner ring of the first inside bearing 38a is fixed relative to the rotary shaft 32 and the inner ring collar 42.

A rear end of the outer ring of the second inside bearing 38b is fixed on a front end 36p of the coupling sleeve 36. Between a front end of the outer ring of the second inside bearing 38b and the non-rotary part 34, a small space is provided. The inner ring of the second inside bearing 38b is fixed relative to the rotary shaft 32 and the inner ring collar 42.

The first outside bearing 40a is arranged in an intermediate area between a center along the direction X of the central axis of the coupling sleeve 36 and an installing position of the first inside bearing 38a. A rear end of the inner ring of the first outside bearing 40a is fixed on the first outside support surface 36c of the coupling sleeve 36. The front end of the inner ring of the first outside bearing 40a is released. Between a rear end of the outer ring of the first outside bearing 40a and the non-rotary part 34, a small space is provided. A front end of the outer ring of the first outside bearing 40a is fixed on the outer ring collar 44.

The second outside bearing 40b is arranged in an intermediate area between a center along the direction X of the central axis of the coupling sleeve 36 and an installing position of the second inside bearing 38b. A rear end of the inner ring of the second outside bearing 40b is released. A front end of the inner ring of the second outside bearing 40b is fixed on the coupling sleeve 36. The outer ring of the second outside bearing 40b is stationary.

The outer ring of the first inside bearing 38a, the outer ring of the second inside bearing 38b, the coupling sleeve 36, the inner ring of the first outside bearing 40a, and the inner ring of the second outside bearing 40b are integrally fixed with one another. All of the first inside bearing 38a, the first outside bearing 40a, the second inside bearing 38b, and the second outside bearing 40b receive the preloads, respectively, under the linkage relationship in a first direction X1 along the direction X of the central axis of the rotary shaft 32. In this case, the pushing force is applied on the front end of the outer ring of the first inside bearing 40a. The pushing force is transmitted to the inner ring of the first inside bearing 38a via balls of the first outside bearing 40a, the rear end of the inner ring of the first outside bearing 40a, the coupling sleeve 36, the front end of the outer ring of the first inside bearing 38a, and balls of the first inside bearing 38a. Furthermore, the pushing force applied on the coupling sleeve 36 is transmitted to the outer ring of the second outside bearing 40b via the front end of the inner ring of the second outside bearing 40b and balls of the second outside bearing 40b. Furthermore, the pushing force applied on the coupling sleeve 36 is transmitted to the inner ring of the second inside bearing 38b via the front end of the outer ring of the second inside bearing 38b and balls of the second inside bearing 38b by means of the stopper.

In the embodiment shown in FIG. 2, under a condition in which the inner ring of the first inside bearing 38a and the inner ring of the second inside bearing 38b are fixed on the rotary shaft 32, when the outer ring of the first outside bearing 40a is being fixed on the non-rotary part 34, the outer ring of the first outside bearing 40a slightly moves in a first direction X1 along the direction X of the central axis of the rotary shaft 32. Interlocking with such, the coupling sleeve 36 slightly moves in the first direction X1 along the direction X of the central axis of the rotary shaft. The outer ring of the second inside bearing 38b and the inner ring of the second outside bearing 40b also slightly move in the first direction X1. All of the first inside bearing 38a, the first outside bearing 40a, the second inside bearing 38b, and the second outside bearing 40b receive the preloads, respectively, under the linkage relationship Thus, it is possible to balance the preloads applied on the inside bearing 38 and the outside bearing 40, respectively, and obtain stable rotation.

Embodiment 3

Figure 3:
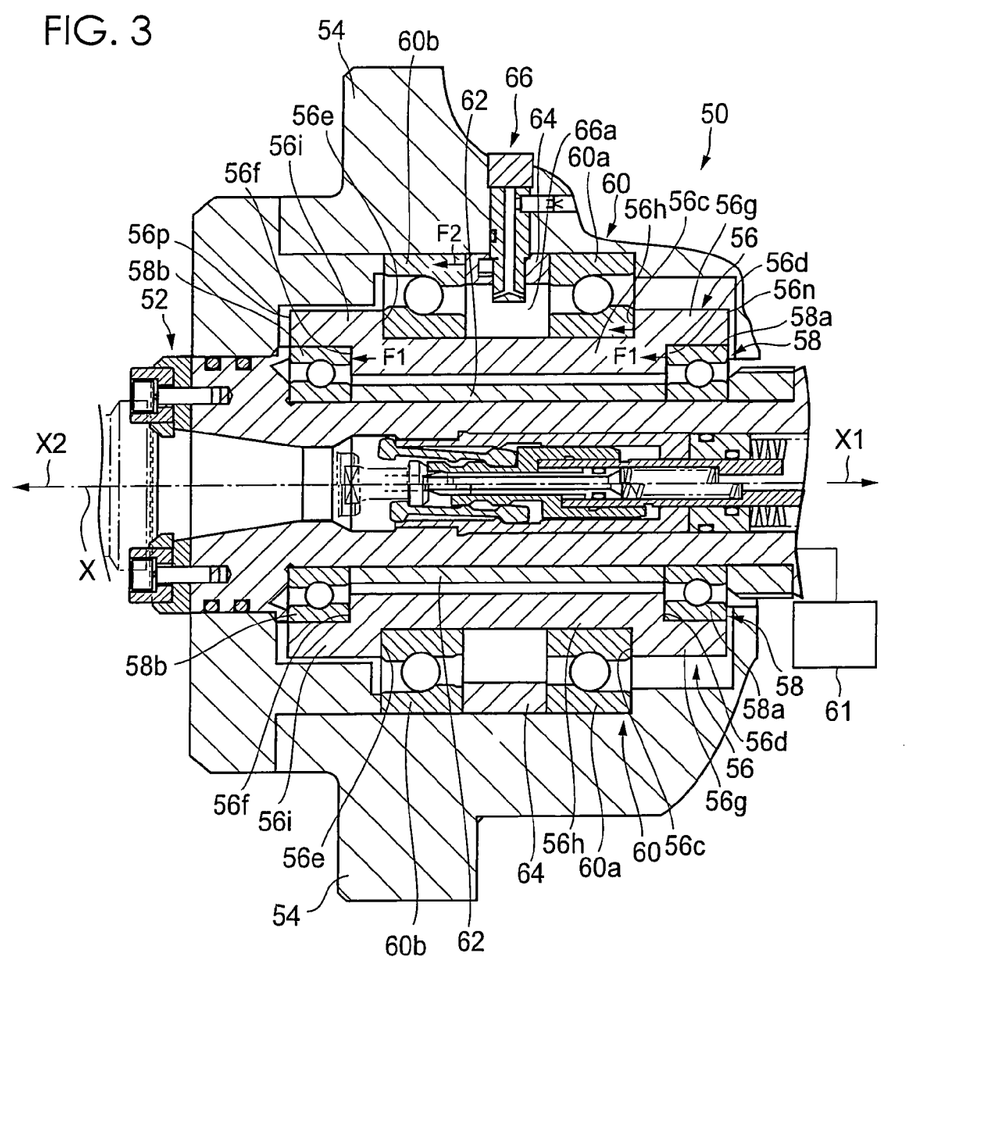
FIG. 3 is a partial sectional view illustrating a rotary apparatus according to another embodiment of the present invention.

A third embodiment according to the present invention will be described with reference to the drawing.

FIG. 3 is a partial sectional view illustrating one example of a rotary apparatus according to the present invention.

A rotary apparatus 50 has a rotary shaft 52, a non-rotary part 54, a coupling sleeve 56, an inside bearing 58, an outside bearing 60, and a driving source 61. The coupling sleeve is configured as a rotary member of the present invention. Since a supply means 66 has the same configuration as the supply means 26 of FIG. 1, explanation thereof will be omitted.

The rotary apparatus 50 is preferably used for a spindle head of a machine tool.

The rotary shaft 52 is supported rotatably relative to the non-rotary part 54. The coupling sleeve 56 is provided between the rotary shaft 52 and the non-rotary part 54. The inside bearing 58 is provided between the rotary shaft 52 and the coupling sleeve 56. The outside bearing 60 is provided between the coupling sleeve 56 and the non-rotary part 54. The rotary shaft 52 can be rotated by means of the driving source 61. The coupling sleeve 56 is freely rotatable between the rotary shaft 52 and the non-rotary part 54.

The inside bearing 58 comprises a first inside bearing 58a and a second inside bearing 58b spaced in a direction X of a central axis of the rotary shaft 32. The first inside bearing 38a and the second inside bearing 38b can be faced in the same direction.

An inner ring collar 62 is provided between an inner ring of the first inside bearing 58a and an inner ring of the second inside bearing 58b. The inner ring collar 62 rotates together with the rotary shaft 52.

The outside bearing 60 comprises a first outside bearing 60a and a second outside bearing 60b spaced in the direction X of the central axis of the rotary shaft 52.

An outer ring collar 64 is provided between an outer ring of the first outside bearing 60a and an outer ring of the second outside bearing 60b. The outer ring collar 64 is stationary together with the non-rotary part 54.

In the embodiment shown in FIG. 3, the coupling sleeve 56 comprises a single member.

An outer ring of the first inside bearing 58a and an inner ring of the first outside bearing 60a are fixed on the coupling sleeve 56.

An outer ring of the second inside bearing 58b and an inner ring of the second outside bearing 60b are fixed on the coupling sleeve 56.

The coupling sleeve 56 comprises a first large diameter part 56g, a small diameter part 56h, and a second large diameter part 56i. The outer ring of the first inside bearing 58a is supported inside the first large diameter part 56g. The inner ring of the first outside bearing 60a and the inner ring of the second outside bearing 60b are supported outside the small diameter part 56h.

The outer ring of the first inside bearing 58a is fixed on the coupling sleeve 56 by means of a stopper not shown in the figure. The outer ring of the first outside bearing 60a is stationary.

The coupling sleeve 56 has a first outside support surface 56c, a first inside support surface 56d, a second outside support surface 56e, and a second inside support surface 56f. The first outside support surface 56c, the first inside support surface 56d, the second outside support surface 56e, and the second inside support surface 56f are vertical with respect to the direction X of the central axis of the rotary shaft 52.

A pushing force is applied on the outer ring of the second outside bearing 60b in the direction X of the central axis of the rotary shaft 52. The pushing force is applied on the outer ring of the second inside bearing 58b via the second outside support surface 56e and the second inside support surface 56f. Further, a pushing force applied on the coupling sleeve 56 is applied on the inner ring of the first outside bearing 60a via the first outside support surface 56c.

The pushing force is applied on the inner ring of the second outside bearing 60b along the direction X of the central axis of the rotary shaft 52. The coupling sleeve 56 transmits the pushing force to the outer ring of the second inside bearing 58b. Furthermore, the pushing force is applied on the inner ring of the first outside bearing 60a along the direction X of the central axis of the rotary shaft 52. The coupling sleeve 56 transmits the pushing force to the outer ring of the first outside bearing 60a.

Thus, it is possible to balance at least a first preload F1 applied on the second inside bearing 58b and a second preload F2 applied on the second outside bearing 60b.

In the following, configuration around the coupling sleeve 56, the inside bearing 58, and the outside bearing 60 will be described in more detail. In the following, a rear end is at a side of the driving source 61, while a front end is at a side of a work piece not shown in the figure.

A front end of the outer ring of the first inside bearing 58a is fixed on a rear end 56n of the coupling sleeve 56. A rear end of the outer ring of the first inside bearing 58a is released. The inner ring of the first inside bearing 58a is fixed relative to the rotary shaft 52 and the inner ring collar 62.

A rear end of the outer ring of the second inside bearing 58b is fixed on a front end 56p of the coupling sleeve 56. Between a front end of the outer ring of the second inside bearing 58b and the non-rotary part 54, a small space is provided. The inner ring of the second inside bearing 58b is fixed relative to the rotary shaft 52 and the inner ring collar 62.

The first outside bearing 60a is arranged in an intermediate area between a center along the direction X of the central axis of the coupling sleeve 56 and an installing position of the first inside bearing 58a. A rear end of the inner ring of the first outside bearing 60a is fixed on the first outside support surface 56c of the coupling sleeve 56. The front end of the inner ring of the first outside bearing 60a is released. The outer ring of the first outside bearing 60a is stationary.

The second outside bearing 60b is arranged in an intermediate area between a center along the direction X of the central axis of the coupling sleeve 56 and an installing position of the second inside bearing 58b. A rear end of the inner ring of the second outside bearing 60b is released. A front end of the inner ring of the second outside bearing 60b is fixed on the coupling sleeve 56. A rear end of the outer ring of the second outside bearing 60b is fixed on the outer ring collar 64. Between a front end of the outer ring of the second outside bearing 60b and the non-rotary part 54, a small space is provided.

The outer ring of the first inside bearing 58a, the outer ring of the second inside bearing 58b, the coupling sleeve 56, the inner ring of the first outside bearing 60a, and the inner ring of the second outside bearing 60b are integrally fixed with one another. All of the first inside bearing 58a, the first outside bearing 60a, the second inside bearing 58b, and the second outside bearing 60b receive the preloads, respectively, under the linkage relationship in a second direction X2 along the direction X of the central axis of the rotary shaft 52. In this case, the pushing force is applied on the rear end of the outer ring of the second outside bearing 60b. The pushing force is transmitted to the inner ring of the second inside bearing 58b via balls of the second outside bearing 60b, the front end of the inner ring of the second outside bearing 60b, the coupling sleeve 56, the front end of the outer ring of the second inside bearing 58b, and balls of the second inside bearing 58b. Furthermore, the pushing force applied on the coupling sleeve 56 is transmitted to the outer ring of the first outside bearing 60a via the rear end of the inner ring of the first outside bearing 60a and balls of the first outside bearing 60a. Furthermore, the pushing force applied on the coupling sleeve 56 is transmitted to the inner ring of the first inside bearing 58a via the rear end of the outer ring of the first inside bearing 58a and balls of the first inside bearing 58a by means of the stopper.

In the embodiment shown in FIG. 3, under a condition in which the inner ring of the first inside bearing 58a and the inner ring of the second inside bearing 58b are fixed on the rotary shaft 52, when the outer ring of the second outside bearing 60b is being fixed on the non-rotary part 54, the outer ring of the second outside bearing 60b slightly moves in a second direction X2 along the direction X of the central axis of the rotary shaft 52. Interlocking with such, the coupling sleeve 56 slightly moves in the second direction X2 along the direction X of the central axis of the rotary shaft. The outer ring of the first inside bearing 58a and the inner ring of the first outside bearing 60a also slightly move in the second direction X2. All of the first inside bearing 58a, the first outside bearing 60a, the second inside bearing 58b, and the second outside bearing 60b receive the preloads, respectively, under the linkage relationship.

Thus, it is possible to balance the preloads applied on the inside bearing 58 and the outside bearing 60, respectively, and obtain stable rotation.

The present invention is not limited to the embodiment illustrated in the drawings. Although the first outside bearing and the second outside bearing are both provided inside the first inside bearing and the second inside bearing in the direction of the central axis, such an arrangement may be optionally modified. A shape of the rotary member is not limited to those shown in the figures.

What is claimed is:

1. A rotary apparatus comprising:
a non-rotary part,
a rotary shaft rotatable relative to the non-rotary part,
a rotary member provided between the rotary shaft and the non-rotary part,
an inside bearing provided between the rotary shaft and the rotary member, and
an outside bearing provided between the rotary member and the non-rotary part,
wherein the inside bearing comprises a first inside bearing and a second inside bearing which are spaced to each other along a direction of a central axis of the rotary shaft,
wherein the outside bearing comprises a first outside bearing and a second outside bearing, which are, spaced each other along the direction of the central axis of the rotary shaft,
wherein an outer ring of the first inside bearing and an inner ring of the first outside bearing are fixed on the rotary member,
wherein an outer ring of the second inside bearing and an inner ring of the second outside bearing are fixed on the rotary member,
wherein an inner ring of the first inside bearing and an inner ring of the second inside bearing are fixed on the rotary shaft, wherein an outer ring of the first outside bearing and an outer ring of the second outside bearing are fixed on the non-rotary part, wherein the first inside bearing, the first outside bearing, the second inside bearing, and the second outside bearing are interlocked such that the outer ring of the first outside bearing and the outer ring of the second outside bearing move along the direction of the central axis of the rotary shaft, and the rotary member slightly moves along the direction of the central axis, such that at least two of the first inside bearing, the first outside bearing, the second inside bearing, and the second outside bearing receive preloads, respectively, with a linkage relationship.

2. The rotary apparatus according to claim 1,
wherein the rotary member is divided into a first rotary member and a second rotary member,
wherein the outer ring of the first inside bearing, the first rotary member, and the inner ring of the first outside bearing are integrally fixed with each other,
wherein the outer ring of the second inside bearing, the second rotary member, and the inner ring of the second outside bearing are integrally fixed with each other,
wherein the outer ring of the first outside bearing and the outer ring of the second outside bearing slightly move in opposite directions along the direction of the central axis of the rotary shaft, and the first rotary member and the second rotary member slightly move in opposite directions along the direction of the central axis of the rotary shaft, whereby the first inside bearing and the first outside bearing receive a first preload and a second preload, respectively, under the linkage relationship along a first direction along the direction of the central axis of the rotary shaft, and further, the second inside bearing and the second outside bearing receive a first preload and a second preload, respectively, under the linkage relationship along a second direction opposite to the first direction along the direction of the central axis of the rotary shaft.

3. The rotary apparatus according to claim 2,
wherein the outer ring of the first inside bearing is fixed at a rear end of the first rotary member, wherein the outer ring of the second inside bearing is fixed at a front end of the second rotary member, wherein the inner ring of the first outside bearing is arranged in an intermediate area between the front end of the first rotary member and an installing position of the first inside bearing, wherein the inner ring of the second outside bearing is arranged in an intermediate area between the rear end of the second rotary member and an installing position of the second inside bearing.

4. The rotary apparatus according to claim 2, wherein the first rotary member comprises a first large diameter part and a first small diameter part, wherein the outer ring of the first inside bearing is supported inside the first large diameter part, wherein the inner ring of the first outside bearing is supported outside the first large diameter part, wherein the second rotary member comprises a second large diameter part and a second small diameter part, wherein the outer ring of the second inside bearing is supported inside the second large diameter part, wherein the inner ring of the second outside bearing is supported outside the second small diameter part.

5. The rotary apparatus according to claim 1, wherein the rotary member is configured as a single member, wherein, all of the first inside bearing, the first outside bearing, the second inside bearing, the second outside bearing receive respective preloads under the linkage relationship.

6. The rotary apparatus according to claim 3, wherein the first rotary member comprises a first large diameter part and a first small diameter part, wherein the outer ring of the first inside bearing is supported inside the first large diameter part, wherein the inner ring of the first outside bearing is supported outside the first large diameter part, wherein the second rotary member comprises a second large diameter part and a second small diameter part, wherein the outer ring of the second inside bearing is supported inside the second large diameter part, wherein the inner ring of the second outside bearing is supported outside the second small diameter part.

7. A rotary apparatus comprising:

a non-rotary part, a rotary shaft rotatable relative to the non-rotary part, a rotary member provided between the rotary shaft and the non rotary part, an inside bearing provided between the rotary shaft and the rotary member, and an outside bearing provided between the rotary member and the non-rotary part, wherein the outside bearing is lubricated with an oil air or an oil mist, while the inside bearing is lubricated with a grease.

* * * * *

UNITED STATES PATENT AND TRADEMARK OFFICE
CERTIFICATE OF CORRECTION

PATENT NO. : 7,458,728 B2
APPLICATION NO. : 11/330133
DATED : December 2, 2008
INVENTOR(S) : Kitamura et al.

It is certified that error appears in the above-identified patent and that said Letters Patent is hereby corrected as shown below:

Column 14, line 16, "are, spaced each" should read -- are spaced from each --.

Signed and Sealed this

Twelfth Day of January, 2010

David J. Kappos
*Director of the United States Patent and Trademark Office*